United States Patent
Thiebaud et al.

(10) Patent No.: US 8,428,299 B2
(45) Date of Patent: Apr. 23, 2013

(54) METHOD OF PROCESSING IMAGES TO COMBAT COPYING

(75) Inventors: Sylvain Thiebaud, Noyal sur Vilaine (FR); Pascal Bourdon, Le Grand Fougeray (FR); Didier Doyen, La Bouexiere (FR)

(73) Assignee: Thomson Licensing, Issy-les-Moulineaux (FR)

( * ) Notice: Subject to any disclaimer, the term of this patent is extended or adjusted under 35 U.S.C. 154(b) by 992 days.

(21) Appl. No.: 12/455,546

(22) Filed: Jun. 3, 2009

(65) Prior Publication Data

US 2010/0098288 A1   Apr. 22, 2010

(30) Foreign Application Priority Data

Jun. 12, 2008   (FR) ...................................... 08 53908

(51) Int. Cl.
*G06K 9/00*   (2006.01)
(52) U.S. Cl.
USPC ......................................................... 382/100
(58) Field of Classification Search .................... 382/100
See application file for complete search history.

(56) References Cited

U.S. PATENT DOCUMENTS

| | | | |
|---|---|---|---|
| 6,813,367 | B1 | 11/2004 | Bhattacharjya |
| 7,386,125 | B2 * | 6/2008 | Bilobrov et al. ............. 380/201 |
| 2002/0168069 | A1 * | 11/2002 | Tehranchi et al. ............ 380/235 |
| 2004/0081318 | A1 | 4/2004 | Bilobrov et al. |
| 2006/0008144 | A1 | 1/2006 | Prasad et al. |
| 2007/0121996 | A1 | 5/2007 | Blonde et al. |
| 2010/0303284 | A1 * | 12/2010 | Hannigan et al. ............ 382/100 |

FOREIGN PATENT DOCUMENTS

| | | |
|---|---|---|
| EP | 1 830 582 A1 | 9/2007 |
| WO | WO 02/23905 A1 | 3/2007 |

OTHER PUBLICATIONS

Luo, Object-related Illustration Watermarks in Cartoon Images, Feb. 2004, pp. 1-57.*
French Search Report dated Feb. 26, 2009.

* cited by examiner

*Primary Examiner* — John Strege
(74) *Attorney, Agent, or Firm* — Myers Wolin, LLC

(57) ABSTRACT

The invention relates to a method of processing source images which is intended to combat their copying by a camcorder or a camera during their display, for example in a cinema hall. The source image sequence represents a scene. According to the invention, the method comprises the following steps:
- detection, in the said scene, of at least one zone corresponding to an object of the scene,
- selection of the entirety of the pixels of the said at least one zone in at least one source image of the sequence; and
- processing of the said at least one source image to modify the color of the selected pixels or the spectral composition of the light emitted by the selected pixels so that the perceived color of the selected pixels is unchanged in the processed source image with respect to the source image.

3 Claims, 4 Drawing Sheets

METHOD OF PROCESSING IMAGES TO COMBAT COPYING

METHOD OF PROCESSING IMAGES TO COMBAT COPYING

This application claims the benefit, under 35 U.S.C. §119 of French Patent Application 0853908, filed Jun. 12, 2008.

FIELD OF THE INVENTION

The present invention lies in the field of the protection of video contents. The invention relates to a method of processing source images which is intended to combat their copying by a camcorder or a camera during their display, for example in a cinema hall.

TECHNOLOGICAL BACKGROUND

Several so-called anti-camcorder techniques have been developed recently for combating this illegal copying. In the subsequent description, the expression illegal copy is understood to imply a film copy made fraudulently by a camcorder or a camera. Likewise, the expression illegal viewer refers to a viewer watching an illegal copy. Conversely, a film copy which has been distributed legally is referred to as a legal copy. Legal viewer refers to a viewer watching a legal copy. These anti-camcorder techniques are essentially aimed at impairing the quality of the images captured by the camcorder by utilizing the differences between the human visual system and the camcorder's image capture system.

A first known anti-camcorder technique consists in temporally modulating the colour of pixels of the source image around their starting value in the source image. The modulation frequency is determined so that the modulation is invisible to the human eye but appears on the copy captured by the camcorder. If only the chrominance of the pixels is modulated, the modulation frequency is for example selected so as to be greater than the colour fusion frequency of the human eye, which is of the order of 20 Hz. If only the luminance of the pixels is modulated, the modulation frequency is selected so as to be greater than the flicker frequency, which is of the order of 60 Hz. The image pixels thus modulated can be arbitrary but are more generally selected to represent a so-called scrambling pattern on the images captured by the camcorder. This scrambling pattern is for example a message, a text or a symbol.

This temporal modulation technique is illustrated by FIGS. 1 and 2. FIG. 1 shows a source image representing a scene in which a character 10 is placed in front of a background 11 of different colour. This source image has to be protected against copying. The temporal modulation technique consists in modifying the colour of certain pixels of the image to reveal the scrambling pattern "COPY" on the images captured by the camcorder as illustrated in FIG. 2. With this aim, the source image of FIG. 1 is decomposed into n different component images which will be displayed successively. In the example of FIG. 2, the source image is decomposed into 2 component images. The colour-modulated pixels belong to the background 11 of the scene. In the first component image (left image), the colour of the pixels of the pattern is o equal to C+ and, in the second component image (right image), it is equal to C−. When these two component images are displayed successively with a display frequency greater than the colour fusion frequency, the human eye perceives a colour C which is the mean of the colours C+ and C−. The pattern is therefore invisible to the legal viewer.

FIG. 3 illustrates a way of defining the colours C+ and C− with respect to the colour C. In this example, it is considered that the colours C+ and C− have one and the same luminance and different chrominances. FIG. 3 represents the CIE xy chromaticity diagram generally associated with the CIE xyY colour space where Y represents the luminance and x and y represent the chrominance. In this diagram, the chrominances visible to the average human being lie in the horseshoe-shaped zone. This zone is conventionally called the gamut of human vision. Each colour of the space, defined by a point in the CIE xyY space, can also be defined by a colour vector (not represented) linking the origin of the xyY reference frame to the said point in space. The colours displayable by a video projector are contained inside a triangle T whose extremities correspond to the three primaries of the projector, namely red, green and blue. The bidimensional space formed by the CIE xy chromaticity diagram not being linear in relation to human vision, the points identifying the colours C+ and C− are defined in another space, the CIE XYZ space, which is recognized as being linear in relation to human vision. In the CIE XYZ space, the points identifying the colours C+ and C− are defined in such a way that they belong to the straight line passing through the point identifying the colour C, the two points representing the colours C+ and C− being equidistant from the point of the colour C. Of course, in order for these two colours C+ and C− to be displayable by the projector, they must be present inside the triangle T. Reasoning more generally in the CIE XYZ colour space, the colour vector associated with the colour C+ is defined to be symmetric, with respect to the colour vector associated with the colour C, with the colour vector associated with the colour C−. Moreover, to increase the amplitude of the modulation and maximize the effect on illegal copying, the remotest possible points C+ and C− are preferably selected.

According to this temporal modulation technique, the eye of the viewer integrates the two colours C+ and C− and then perceives the resulting colour, i.e. the colour C. The pattern is therefore invisible to the viewer. Nevertheless, when the integration of the two colours is interrupted by a blink of the eyes or when the two consecutive images are not projected at the same place on the retina because of micro-movements of the eyes, the colour of the pixel is no longer correctly reconstructed. The scrambling pattern may then be perceived by the legal viewer and disturb the latter inconveniently.

Another known anti-camcorder technique consists in using metameric colours to insert a scrambling pattern into the image sequence as described in the American patent application published under the number US2004/0081318. Two colours are said to be metameric when they are perceived as equivalent by the human visual system although having different spectra.

More precisely, the International Commission on Illumination (CIE) has defined three colorimetric functions, denoted $\bar{x}$, $\bar{y}$ and $\bar{z}$, for the response of the human visual system. These three functions represented in FIG. 4 are used to convert the spectrum of the light received by the eye into three values, denoted X, Y and Z respectively. These three values define the colour perceived by the eye. They can be calculated in the following manner:

$$X = \sum_{400\,nm}^{700\,nm} E(\lambda) \cdot \bar{x}(\lambda) \cdot \Delta\lambda$$

-continued $$Y = \sum_{400\,nm}^{700\,nm} E(\lambda) \cdot \bar{y}(\lambda) \cdot \Delta\lambda$$

$$Z = \sum_{400\,nm}^{700\,nm} E(\lambda) \cdot \bar{z}(\lambda) \cdot \Delta\lambda$$

where $E(\lambda)$ represents the energy of the illuminant.

It is therefore possible to calculate, for an illuminant whose spectrum is known, the values X, Y and Z. It should be noted that, in more complex models, the calculation of the values X, Y, Z can take account of the observer's age, the viewing angle and/or other parameters.

If a first illuminant whose spectrum is $S_1$ is considered, the colour $C_1$ perceived by the viewer is defined by the values $X_1$, $Y_1$ and $Z_1$ such that:

$$X_1 = \sum_{400\,nm}^{700\,nm} S_1(\lambda) \cdot \bar{x}(\lambda) \cdot \Delta\lambda$$

$$Y_1 = \sum_{400\,nm}^{700\,nm} S_1(\lambda) \cdot \bar{y}(\lambda) \cdot \Delta\lambda$$

$$Z_1 = \sum_{400\,nm}^{700\,nm} S_1(\lambda) \cdot \bar{z}(\lambda) \cdot \Delta\lambda$$

Likewise, if a second illuminant whose spectrum is $S_2$ different from $S1$ is considered, the colour $C_2$ perceived by the viewer is defined by the values $X_2$, $Y_2$ and $Z_2$ such that:

$$X_2 = \sum_{400\,nm}^{700\,nm} S_2(\lambda) \cdot \bar{x}(\lambda) \cdot \Delta\lambda$$

$$Y_2 = \sum_{400\,nm}^{700\,nm} S_2(\lambda) \cdot \bar{y}(\lambda) \cdot \Delta\lambda$$

$$Z_2 = \sum_{400\,nm}^{700\,nm} S_2(\lambda) \cdot \bar{z}(\lambda) \cdot \Delta\lambda$$

The human eye perceives an equivalent colour for C1 and C2 if $$C_1 \equiv C_2 \Leftrightarrow \begin{cases} X_1 = X_2 \\ Y_1 = Y_2 \\ Z_1 = Z_2 \end{cases}$$

The colours $C_1$ and $C_2$ are said to be metameric if, perceived in an equivalent manner by the human eye, they have different spectra $S_1 \neq S_2$. $C_1$ and $C_2$ are said to correspond to one and the same visual colour since the values $X_1, Y_1$ and $Z_1$ which visually define the colour $C_1$ are identical to the values $X_2, Y_2$ and $Z_2$ which visually define the colour $C_2$. By extension, the spectra $S_1$ and $S_2$ are said to be metameric.

It is possible to produce metameric colours easily by using projection systems with four or more primaries. With these systems, the colour $C_1$ is for example produced by using only three primaries (the colour component corresponding to the fourth primary is then zero) and the colour $C_2$ is produced by using the four primaries (the colour component corresponding to the fourth primary is nonzero).

Referring again to the image of FIG. 1 and as illustrated in FIG. 5, this metamerism technique consists, within the framework of an anti-camcorder application, in employing the colour $C_1$ (the spectrum $S_1$) for pixels of the background which are intended to form the anti-scrambling pattern delimited by the dots, and the colour $C_2$ (the spectrum $S_2$) for the other pixels of the background 11. In this figure, the dots define the limit between that zone of the background 11 displayed with the colour $C_1$ and that zone of the background displayed with the colour is $C_2$.

The main difficulty in this technique is to reproduce metameric colours $C_1$ and $C_2$ which are perceived as equivalent by the human eye on the basis of different combinations of the primaries of the projection system. If these metameric colours are not perceived in a sufficiently equivalent manner, the scrambling pattern is then perceived by the legal viewer and disturbs the latter inconveniently.

When the scrambling pattern thus risks being perceived, even slightly, by the legal viewer, this defect is exacerbated by the movements of the objects of the scene with respect to the scrambling pattern, which, for its part, generally remains fixed in the successive images. To avoid this exacerbation in the case of "watermarks" inserted into the image, document WO2002/023905 teaches that the pattern be displaced with one of the objects of the scene, that is to say that the pattern be inserted into an object of the scene. Such an arrangement avoids the exacerbation of the abovementioned defects, but does not remove them since the pattern continues to be perceived in the moving object by the legal viewer.

SUMMARY OF THE INVENTION

The aim of the present invention is to propose an image processing method which reduces the defects for the legal viewer, whatever anti-camcorder processing is employed.

For this purpose, the present invention proposes a method of processing a source image sequence representing a scene, comprising the following steps:
  detection, in the scene, of at least one zone corresponding to an object of the scene,
  selection of the entirety of the pixels included in the said at least one zone in at least one source image of the sequence; and
  processing of the said at least one source image to modify the colour of the selected pixels or the spectral composition of the light emitted by the selected pixels so that the perceived colour of the selected pixels is unchanged in the processed source image with respect to the source image.

According to this method, no specific element such as a message is added to the scene to serve as anti-scrambling pattern, which element could generate defects for the legal viewer. According to the invention, the anti-scrambling pattern is an object of the scene represented by the source image sequence. Note that in document U.S. Pat. No. 6,813,367, only a part (and not the entirety) of the pixels included in a zone corresponding to an object (here, the object is a letter of a text) is selected for colour modification, namely the pixels of a region of a stroke of a letter!

Preferably, the contour of the zone corresponding to an object of the scene is the geometric locus of extrema of the first derivative of the colours, or the geometric locus of maxima of the intensity of the gradient of the colours, or else the locus of vanishing of the second derivative of the colours. For example, along any straight line of pixels passing through this contour and preferably normal to this contour at the point of intersection with this contour, the first derivative of the colours along this line passes through an extremum, or the second derivative along this line vanishes. Note that in the case where this object is a letter as in document U.S. Pat. No. 6,813,367, this geometric locus delimits the contours of the whole of this letter, and not of a stroke of this letter.

According to a first embodiment based on a temporal modulation of the colour of the pixels of the detected zone, the step of processing the source image comprises a step of decomposing the said at least one source image into n different component images, a colour vector being associated with each of the pixels of the said source image and of the component images in a predetermined colour space, the colour vector associated with each pixel of the said source image being equal to the resultant divided by n of the colour vectors associated with the n pixels of the component images corresponding to the said pixel of the source image.

In this embodiment, it is advantageously possible to detect several zones, namely a first zone and a second zone each corresponding to an object of the scene represented, to separately select the entirety of the pixels included in the said first and second zones and then to process the component images in such a way that, for at least one component image, the difference vector between the colour vector associated with at least one pixel of the first zone of the source image and the colour vector associated with the corresponding pixel in the said component image is substantially of the same direction and of opposite sense to the difference vector between the colour vector associated with at least one pixel of the second zone of the source image and the colour vector associated with the corresponding pixel in the said component image.

According to a second embodiment based on metamerism, the step of processing the said at least one source image comprises a step of replacing the colour of the selected pixels with a metameric colour.

Advantageously, for a plurality of identical consecutive source images, it is possible to vary the metameric colour used for the selected pixels. In this case, for one and the same pixel selected from two identical consecutive source images, the metameric colour employed in the first of the two consecutive source images is different from the metameric colour employed in the second of the two consecutive source images.

The invention also relates to a method of displaying a source image sequence in which at least one of the said source images is processed by the aforesaid processing method based on the temporal modulation of the colour so as to be decomposed into n different component images, and in which the said component images are displayed successively at a display frequency at n times the display frequency of the source image sequence, the display frequency of the component images being greater than the colour fusion frequency for the human eye.

BRIEF DESCRIPTION OF THE FIGURES

The invention will be better understood, and other aims, details, characteristics and advantages will be more clearly apparent in the course of the detailed explanatory description which follows, with reference to the appended drawings, among which.

DETAILED DESCRIPTION OF PREFERRED EMBODIMENTS

According to the invention, it is proposed to detect at least one object in the captured scene and to use this object as scrambling pattern, that is to say the pixels of the image belonging to this object are o modulated in terms of chrominance and/or luminance or are spectrally modified to reveal the anti-scrambling pattern on the copies captured by a camcorder. Thus, the shape, the size and the position of the scrambling pattern are defined by at least one object of the filmed scene.

In this way, the places where the defects generated by the anti-camcorder processing (temporal modulation or metamerism) could appear are zones of the image corresponding to contours of objects in the image. It follows from this that these possible defects are less perceptible to the legal viewer.

Figure 6:
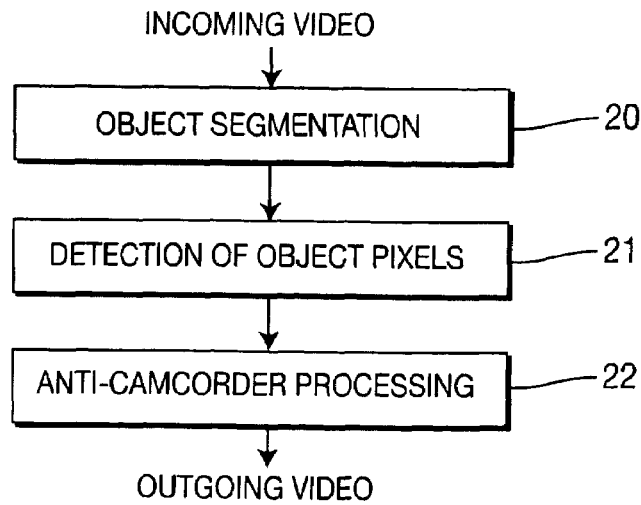
FIG. 6 represents the steps of the method of the invention.

The method of the invention is illustrated by FIG. 6. This method is applied to at least one source image of the image sequence to be protected against copying. It comprises a segmentation step 20 intended to detect at least one zone in the source image corresponding to an object of the scene represented by the source image. This step is for example implemented by an object segmentation algorithm or method such as that described in patent application FR 2 880 455 or by an active-contours-based segmentation method. This segmentation step is aimed at detecting objects in the filmed scene. These objects can be detected by delimiting their contour with the aid of a conventional scheme based on detecting the extrema of the first derivative of the colours, or detecting the maxima of the intensity of the gradient of the colours. A Prewitt, Sobal, or Canny spatial filter can be used for this purpose. This contour delimitation can also be based on detecting the vanishing of the second derivative of the colours, in particular the vanishing of the Laplacian of the colours. In this step, an image zone corresponding to an object of the scene is a zone delimited by a contour.

In the course of the following step, referenced 21, the entirety of the pixels of at least one of the objects detected in the previous step is selected.

In the course of the following step, referenced 22, an anti-camcorder processing (based on temporal modulation of the colour or on metamerism) is applied to the pixels selected in step 21. As the entirety of the pixels has been selected, this selection completely covers one of the detected objects and the anti-camcorder processing reveals no new to object in the processed source image.

Figure 1:
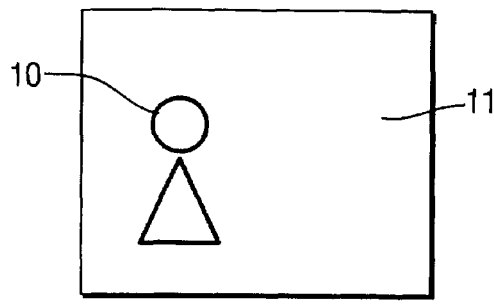
FIG. 1 represents a source image to be protected against copying.
Figure 2:
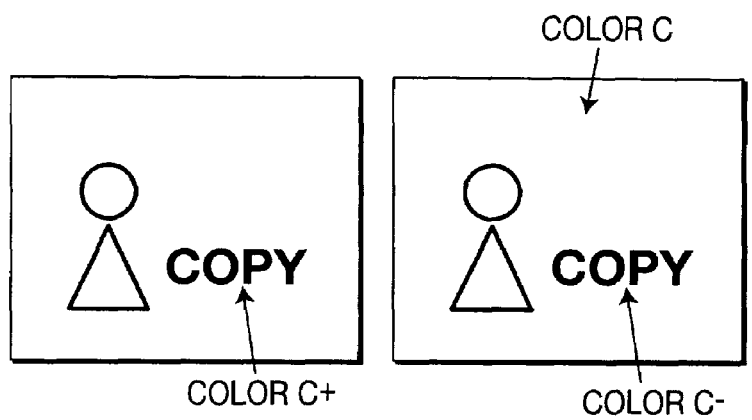
FIG. 2 illustrates an anti-camcorder method based on a temporal modulation of the colour and applied to the image of FIG. 1.
Figure 3:
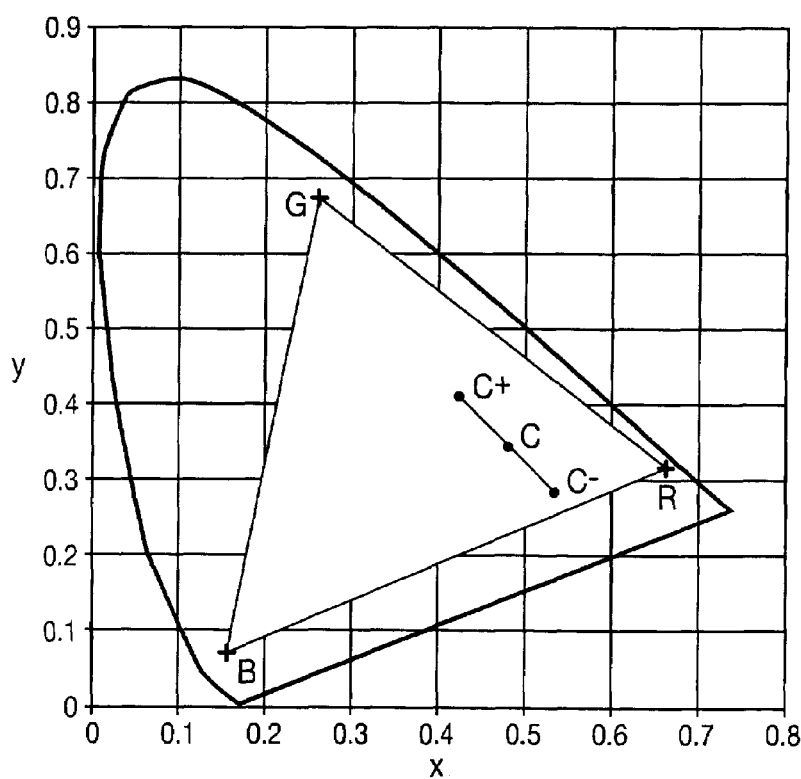
FIG. 3 represents a CIExy chromaticity diagram illustrating the way in which the colours to be used in the case of a chrominance modulation are selected.
Figure 4:
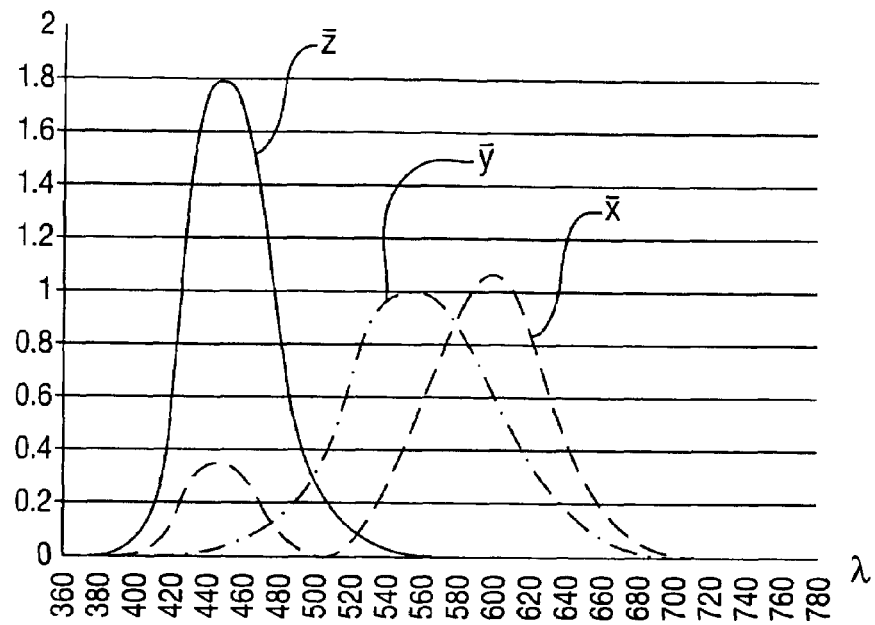
FIG. 4 represents the colorimetric functions $\bar{x}$, $\bar{y}$ and $\bar{z}$ defined by the International Commission on Illumination (CIE) to characterize the response of the human visual system.
Figure 5:
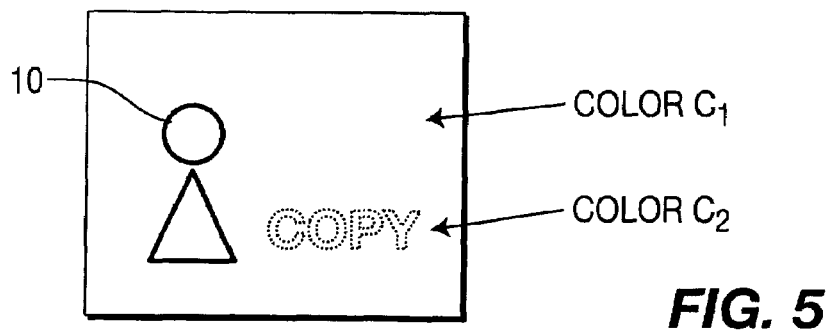
FIG. 5 illustrates an anti-camcorder method based on metamerism and applied to the image of FIG. 1.

If this method is applied to the source image of FIG. 1, the following results are obtained. In step 20, the character 10 is detected in the source image. In step 21, all the pixels of the character 10 are selected. In step 22, the anti-camcorder processing is applied to the is pixels of the character 10.

Figure 7:
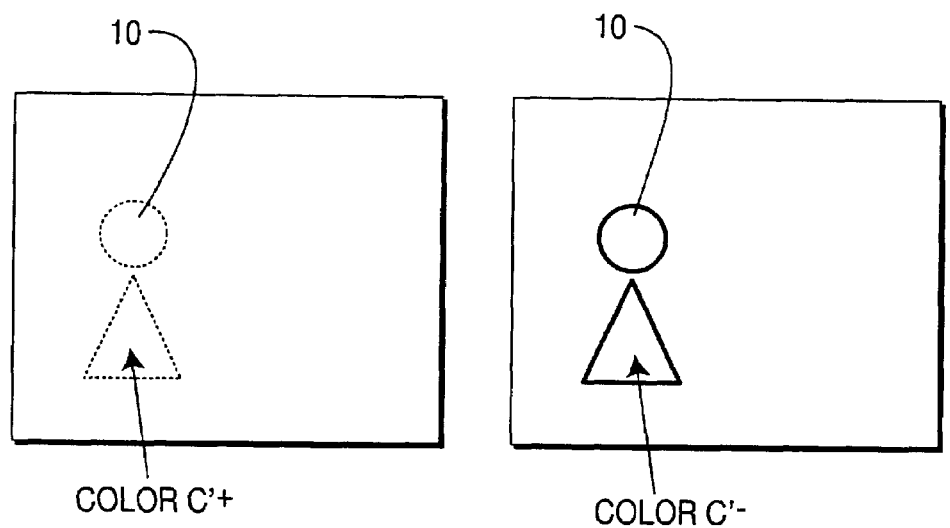
FIG. 7 illustrates a particular mode of the method of the invention when the anti-camcorder processing applied to the source image of FIG. 1 is based on a temporal modulation of the colour.
Figure 9:
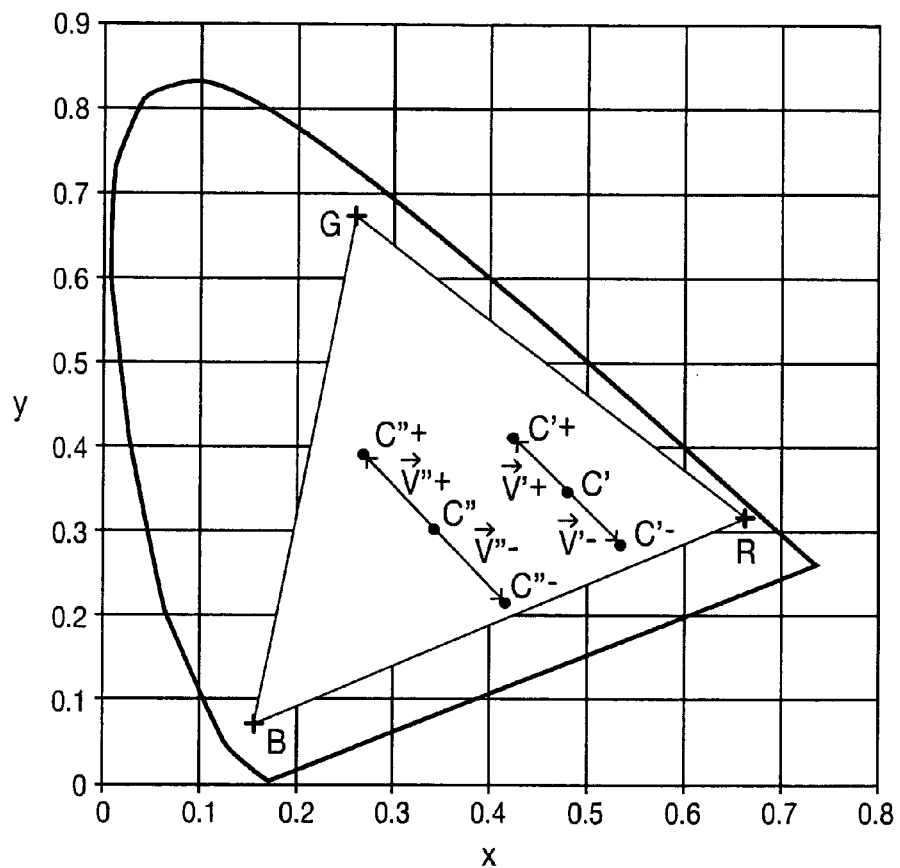
FIG. 9 represents a CIExy chromaticity diagram illustrating the way in which the colours used in the methods illustrated by FIGS. 7 and 8 are selected.

FIG. 7 illustrates the case where the anti-camcorder processing is a temporal modulation of the luminance and/or chrominance of the character 10 employing two component images. The character 10, of colour C' in the source image of FIG. 1, is displayed with a colour C'+ in the first component image and then with a colour C'− in the second component image, the colours C'+ and C'− being defined so that the human eye perceives the colour C' when these two component images are displayed one after the other with a frequency greater than the colour fusion frequency. The colours C'+ and C'− are determined with respect to the colour as shown in FIG. 9. The colour vectors associated with the colours C'+ and C'− are determined so as to be symmetric with respect to the colour vector associated with the colour C' and, advantageously, in such a way that the distance between the points C'+ and C'− is a maximum in the CIE XYZ space.

It follows from this that, if the temporal integration of the two images which is performed by the eye is interrupted by a blink of the viewer's eyes or is disturbed by micro-movements of the eyes, the colour of the character 10 might not be perfectly reconstructed as regards its contours, thereby generating a slight defect, but this defect is of little hindrance to the legal viewer since it does not reveal any new objects in the displayed image.

Figure 8:
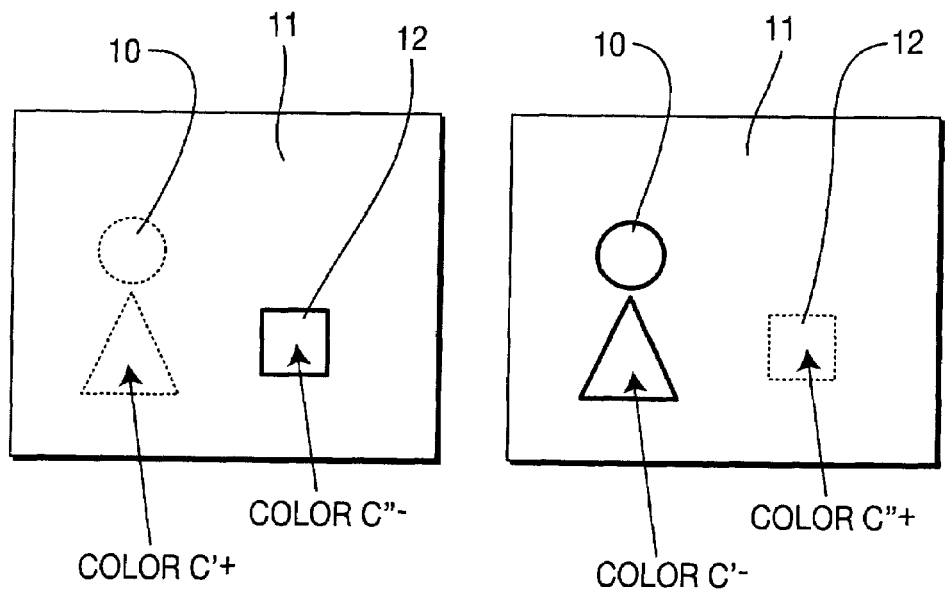
FIG. 8 illustrates a variant of the method of FIG. 7.

According to a refinement, from among the objects detected in the course of step 20, the entirety of the pixels of two objects are selected separately and the colour of these objects is varied in an opposite manner. This embodiment is illustrated by FIG. 8. For this embodiment, a source image identical to that of FIG. 1 is considered, to which an additional object 12 of colour C" has been added. Thus, in the course of step 20, two objects are detected: the object 10 and the to object 12. Two component images are generated from this source image. In the first component image, the object 10 is displayed with the colour C'+ and the object 12 is displayed with a colour C"−. In the second component image, the object 10 is displayed with the colour C'− and the object 12 is displayed with the colour C"+. The colours C'+ and C'− are is defined with respect to the colour C' as illustrated in FIG. 9, namely that the colour vector associated with the colour C'+ is symmetric, with respect to the colour vector associated with the colour C', with the colour vector associated with the colour C'−. Likewise, the colour vector associated with the colour C"+ is defined to be symmetric, with respect to the colour vector associated with the colour C", with the colour vector associated with the colour C"−. According to this refined embodiment, the vector, denoted $\vec{V}"$− (respectively $\vec{V}"$+), linking the point C" to the point C"− (respectively C"+) has the same direction but reverse sense to that of the vector, denoted $\vec{V}'$− (respectively $\vec{V}'$+), linking the point C' to the point C'− (respectively C'+) in the colour space used. By displaying, in the first component image, the colour C'+ for the object 10 and the colour C"− for the object 12, the colour of these objects is modified in opposite senses, and this may increase the hindrance to the illegal viewer.

According to a variant, the second object can be defined with respect to the first object, the second object being for example the part of the image not enclosing the first object. If the image comprises a single object, the second object corresponds to the background of the image. The colours of the first object and of the background of the image are then modified in opposite senses.

In the case of anti-copy processing based on metamerism, the character 10 is displayed with a colour $C'_1$ which is metameric to the colour C'. In this case, the spectrum denoted $S'_1$ corresponding to the colour $C'_1$ is therefore different from the spectrum S' corresponding to the colour C'. The colour of the character on the illegal copy is therefore different from that of the source image since the camcorder does not capture the images like the human eye. The colour of the character on the illegal copy is then not in conformity with that of the source image.

Figure 10:
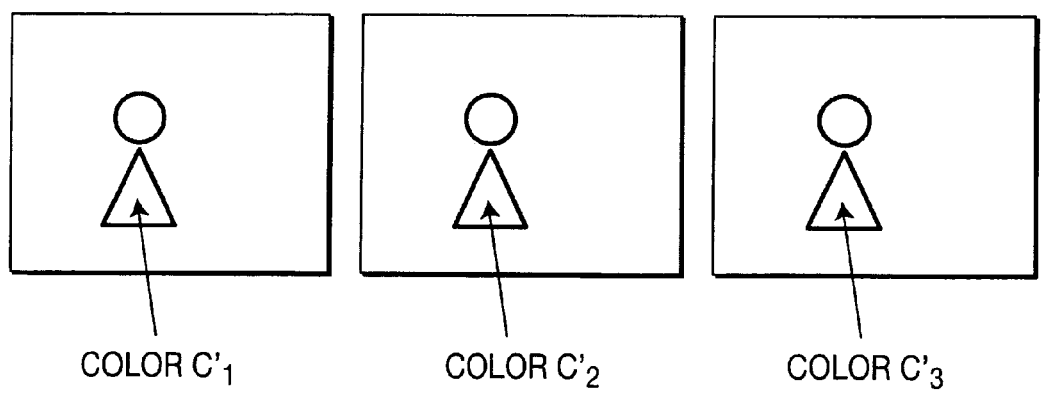
FIG. 10 illustrates a particular mode of the method of the invention when the anti-camcorder processing applied to the source image of FIG. 1 is based on metamerism.

This non-conformity of the colour of the character 10 is nevertheless not necessarily much of a hindrance. Hence, to increase the hindrance to the illegal viewer, it is proposed, according to a refinement, to temporally vary the metameric colour used to display the object serving as anti-scrambling pattern. This refinement is illustrated by FIG. 10. In a first image of the video sequence, the character 10 is displayed with a colour $C'_1$ which is metameric to the colour C'. In the following image, the character is displayed with a second colour $C'_2$ metameric to the colour C'. In the following image, the character is displayed with a third colour $C'_3$ metameric to the colour C'. It is thus possible to vary, periodically or not, the colours employed to display the object serving as anti-scrambling pattern. Within the framework of a projection device with 4 primaries, the metameric colours can be obtained by modifying the value of the colour components of the 4 primaries. Of course, it is possible to increase the number of possible metameric colours by using a projection device having more than 4 primaries.

Although the invention has been described in conjunction with various particular embodiments, it is quite obvious that it is in no way limited thereto and that it comprises all the technical equivalents of the means described as well as their combinations if the latter enter within the framework of the invention. Notably, within the framework of anti-camcorder processing based on temporal modulation, the number n of component images is not limited to 2.

The invention claimed is:

1. Method of processing a source image sequence representing objects in a scene, comprising:

detecting, in said scene, at least a first and a second objects represented in said source image sequence in the scene, selecting separately, in at least one source image of the sequence where said at least first and second detected object is represented, the entirety of the pixels used to represent said at least first and second detected object such that the selected pixels do not correspond to the whole source image; and processing said at least one source image to modify the colour of the selected pixels so that the perceived colour of the selected pixels is unchanged in the processed source image with respect to the source image;

wherein the processing said at least one source image comprises decomposing said at least one source image into n different component images, a colour vector being associated with each of the pixels of said source image and of the component images in a predetermined colour space, the colour vector associated with each pixel of said source image being equal to the resultant divided by n of the colour vectors associated with the n pixels of the component images corresponding to said pixel of the source image; and wherein the processing said at least one source image further comprises a processing of the component images in such a way that, for at least one component image, the difference vector ($\vec{V'}-$; $\vec{V'}+$) between the colour vector associated with at least one pixel of the first object detected in the source image and the colour vector associated with the corresponding pixel in said component image is substantially of the same direction and of opposite sense to the difference vector ($\vec{V''}+$; $\vec{V''}-$) between the colour vector associated with at least one pixel of the second objected detected in the source image and the colour vector associated with the corresponding pixel in said component image.

2. Method of processing a source image sequence representing objects in a scene, comprising:

detecting, in said scene, at least one object represented in said source image sequence in the scene, selecting, in at least one source image of the sequence where said at least one detected object is represented, the entirety of the pixels used to represent said at least one detected object such that the selected pixels do not correspond to the whole source image; and processing said at least one source image to modify the colour of the selected pixels so that the perceived colour of the selected pixels is unchanged in the processed source image with respect to the source image;

wherein the processing said at least one source image comprises decomposing said at least one source image into n different component images, a colour vector being associated with each of the pixels of said source image and of the component images in a predetermined colour space, the colour vector associated with each pixel of said source image being equal to the resultant divided by n of the colour vectors associated with the n pixels of the component images corresponding to said pixel of the source image; and wherein said method further comprises displaying said component images successively at a display frequency at n times the display frequency of the source image sequence, wherein the display frequency of the component images is greater than the colour fusion frequency for the human eye.

3. Method of processing a source image sequence representing objects in a scene, comprising:

detecting, in said scene, at least one object represented in said source image sequence in the scene, selecting, in at least one source image of the sequence where said at least one detected object is represented, the entirety of the pixels used to represent said at least one detected object such that the selected pixels do not correspond to the whole source image; and processing said at least one source image to modify the spectral composition of the light emitted by the selected pixels so that the perceived colour of the selected pixels is unchanged in the processed source image with respect to the source image;

wherein said processing said at least one source image comprises replacing the colour of the selected pixels with a metameric colour in order to modify the spectral composition of the light emitted by the selected pixels, and wherein, for one and the same selected pixel having, in two consecutive source images, the same visual colour, the metameric colour employed in the first of the two consecutive source images is different from the metameric colour employed in the second of the two consecutive source images.

* * * * *